US010694758B1

(12) United States Patent
Melkonian et al.

(10) Patent No.: US 10,694,758 B1
(45) Date of Patent: Jun. 30, 2020

(54) LOW-SULPHUR FRUIT DRYING PROCESS

(71) Applicant: Melkonian Enterprises, Inc., Sanger, CA (US)

(72) Inventors: Mark S. Melkonian, Sanger, CA (US); Nicholas J. Melkonian, Fresno, CA (US)

( * ) Notice: Subject to any disclaimer, the term of this patent is extended or adjusted under 35 U.S.C. 154(b) by 0 days.

(21) Appl. No.: 16/437,243

(22) Filed: Jun. 11, 2019

(51) Int. Cl.
*A23B 7/152* (2006.01)
*A23B 7/02* (2006.01)
*A23B 7/005* (2006.01)

(52) U.S. Cl.
CPC ............ *A23B 7/152* (2013.01); *A23B 7/0053* (2013.01); *A23B 7/0215* (2013.01); *A23V 2002/00* (2013.01)

(58) Field of Classification Search
CPC ..... A23B 7/152; A23B 7/0053; A23B 7/0215; A23B 7/144
USPC ................ 426/304, 615, 520, 443, 455, 456
See application file for complete search history.

(56) References Cited

U.S. PATENT DOCUMENTS 3,806,610 A * 4/1974 Rahman
4,433,002 A   2/1984 Zilch

FOREIGN PATENT DOCUMENTS

CN        102406036    *  4/2012
CN        107897342 A  *  4/2018

OTHER PUBLICATIONS

Food Revolution Network—"How to Wash Vegetables and Fruits to Remove Pesticides" https://foodreveolution.org/blog/how-to-wash-vetables-fruit/ (Year: 2019).*

* cited by examiner

*Primary Examiner* — Helen F Heggestad
(74) *Attorney, Agent, or Firm* — Marcus N. DiBuduo; John R. Aaron

(57) ABSTRACT

Processes and methods for producing dried fruit which has been treated with sulphur dioxide. Such processes and methods are particularly adapted for producing golden raisins which have relatively low concentrations of sulphur dioxide. To produce golden raisins, fresh sultana grapes are subjected to sulphur dioxide fumigation before undergoing a series of washing and rinsing steps which may include a cold water bath, a hot lye bath, and cold water sprays before being placed into drying tunnels. After drying, golden raisins may be undergo an additional treatment of sulphur dioxide.

3 Claims, 1 Drawing Sheet

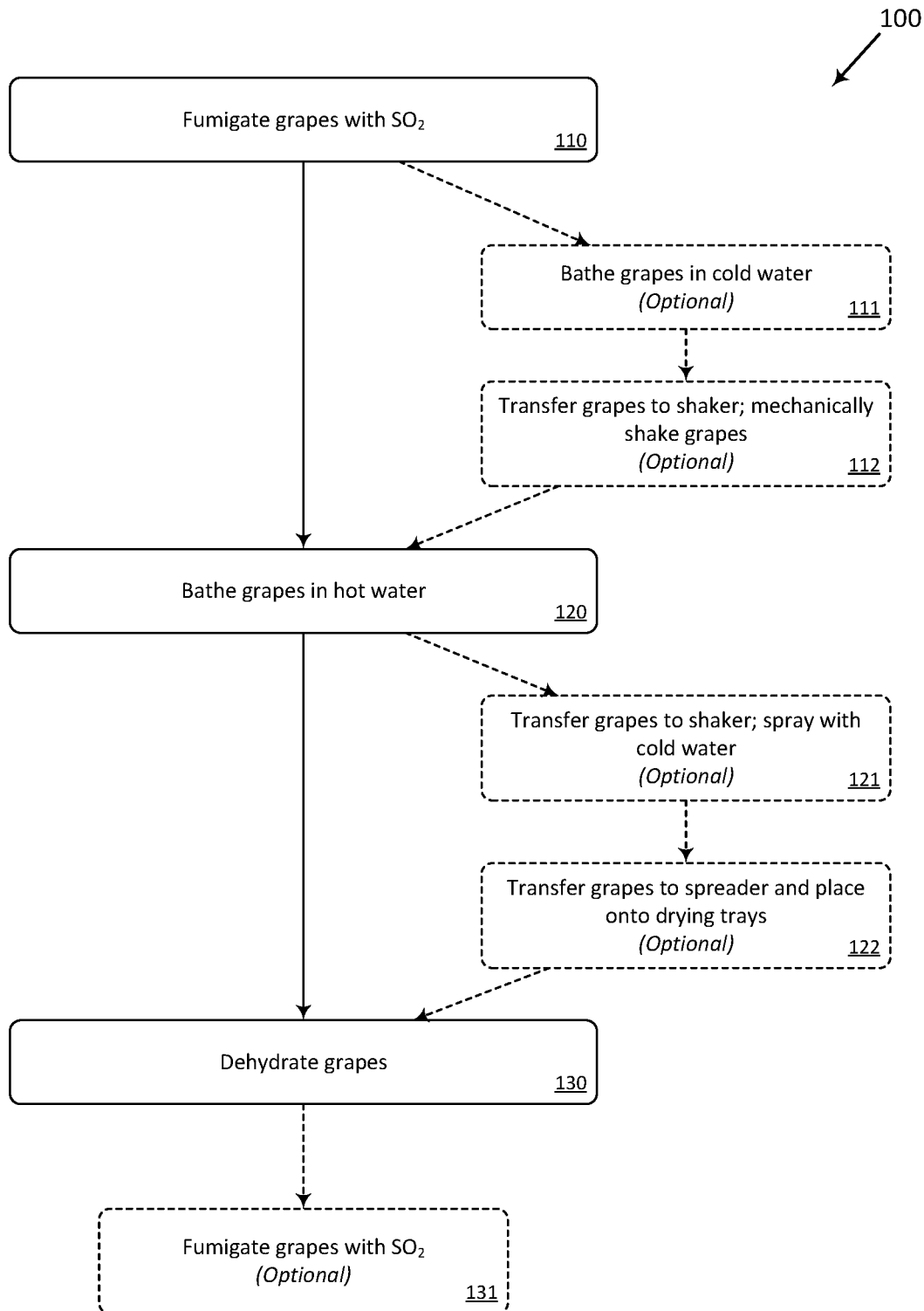

LOW-SULPHUR FRUIT DRYING PROCESS

FIELD OF THE INVENTION

The present invention concerns processes and methods for producing dried fruit. More particularly, some embodiments of the present invention concern processes and methods for producing golden raisins. The production of dried fruit may include a series of steps involving sulphur dioxide treatment, washing, and drying.

BACKGROUND OF THE INVENTION

In the food, beverage, and agricultural industry, preservatives are commonly added to various types of foods and drinks to maintain freshness. Of those preservatives, sulfur dioxide is often used to preserve dried fruits by preventing spoilage and maintaining a healthy appearance of the fruit. For large-scale production and distribution, sulfur dioxide plays a crucial role in protecting the vibrant color of golden raisins, while also extending their shelf life.

While sulphur dioxide is a viable preservative for dried fruits, as well as many other types of foods, its potential impact on human health has brought about cautiousness concerning the amounts of the preservative found in our foods. In some cases, limitations on the maximum allowable concentrations of sulphur dioxide (and sulfites, in general) in various types of foods and drinks are set in place by governmental authorities. As a result of such regulations, as well as general public awareness, food and beverage producers are seeking out better methods for reducing the amounts of preservatives found in their products.

For the fruit industry, it is equally important to produce viable dried fruits with a minimal amount of preservatives. With respect to conventionally processed golden raisins, sulphur dioxide concentrations tend to range from about 2000 ppm to 3500 ppm, which, in relation to other sulfite-containing foods, is relatively high—possibly increasing the chances of health complications, especially for those who may be sensitive to sulfites. It is therefore desirable for improved production methods which can reduce sulfite concentrations in golden raisins, as well as in other types of fruits, without degrading the physical or nutritional quality thereof.

BRIEF SUMMARY OF THE INVENTION

The present invention concerns processes and methods for producing low-sulphur (in the form of sulphur dioxide) dried fruit. In particular, the processes and methods described herein are well-adapted for producing golden raisins, which are green, seedless grapes which have been treated with sulphur dioxide and mechanically dried (i.e., not sun dried). In preferred embodiments, fresh grapes of the sultana, or Thompson Seedless, variety may be subjected to sulphur dioxide treatment, one or more water or lye baths and/or treatments, and mechanical drying to yield vibrantly colored and flavorful golden raisins having a sulphur dioxide content which is at least 60% less than golden raisins produced by conventional processes.

Embodiments of the present invention may, generally, include a series of steps involving: i) a fumigating step, which may include fumigating a fruit with sulphur dioxide; ii) a bathing step, which may include bathing the fruit in a hot fluid; and iii) a dehydrating step, which may include dehydrating the fruit. In preferred embodiments, the bathing step may be performed before the fumigating step and the dehydrating step may be performed before the bathing step. In some embodiments, after the fumigation step, the fruit may be bathed in a cold fluid and/or mechanically shaken on a shaker. After the bathing step, the fruit may be mechanically shaken on a shaker and/or sprayed with cold water. In some embodiments, after the dehydrating step, the fruit may be fumigated with an additional amount of sulphur dioxide. In preferred embodiments of the present invention, a fruit may be a fresh, seedless grape, preferably of the sultana variety.

In certain embodiments of the present invention, a fruit may be bathed in a hot fluid comprising a lye bath with dissolved sodium hydroxide, the temperature of which may be dependent on the sugar content of the provided fruit and/or the concentration of sodium hydroxide. For example, a hot water bath may be maintained at a relatively low temperature for fruit which has relatively low sugar content (i.e., low Brix values), whereas the hot water bath may be maintained at a relatively high temperature for fruit which has relatively high sugar content (i.e., high Brix values). Additionally, if the water bath has a relatively low concentration of sodium hydroxide, it may be maintained at a higher temperature, whereas the water bath may be maintained at a lower temperature if it has a relatively low concentration of sodium hydroxide.

In preferred embodiments, once a fruit is ready to be dried, the fruit may be stacked in drying trays and placed into one or more drying tunnels for up to 24 hours. Once dried, the sulphur dioxide content of the fruit may be measured to determine if additional sulphur dioxide should be added. Generally, the dried fruit may have a sulphur dioxide concentration between about 100 and 1000 ppm. However, if sulphur dioxide concentrations are below a target or desired level, the dried fruit may undergo an additional treatment of sulphur dioxide.

In accordance with some embodiments of the present invention, a process for producing low-sulphur raisins may include the steps of: i) placing grapes into a sulphur dioxide fumigation chamber; ii) removing the grapes from the chamber and placing the grapes in cold water; iii) removing the grapes from the cold water bath onto placing the grapes onto a shaker; iv) removing the grapes from the shaker and placing the grapes in a hot aqueous solution of sodium hydroxide; v) removing the grapes from the hot aqueous solution and placing the grapes onto another shaker; vi) spraying the grapes with cold water; vii) removing the grapes from the shaker and placing the grapes into a dehydrator. In some embodiments, producing low-sulphur dried raisins may include an additional step of, viii) removing the grapes from the dehydrator and placing the grapes into a sulphur dioxide fumigation chamber.

BRIEF DESCRIPTION OF THE DRAWINGS

FIG. 1 is a flowchart illustrating an exemplary process for producing raisins.

DETAILED DESCRIPTION OF THE INVENTION

The invention, in its various aspects, will be explained in greater detail below. While the invention will be described in conjunction with several exemplary embodiments, the exemplary embodiments themselves do not limit the scope of the invention. Similarly, the exemplary illustrations in the accompanying drawings, where like elements have like numerals, do not limit the scope of the exemplary embodiments and/or invention, including any length, angles or other measurements provided. Rather the invention, as defined by the claims, may cover alternatives, modifications, and/or equivalents of the exemplary embodiments. And although one or more aspects of the invention are described with reference to grapes (or varieties of grapes), it is to be appreciated that the invention is not limited to the processing of grapes or any particular variety of grapes, and accordingly, the invention may be practiced with other fruits.

Referring to FIG. 1, an exemplary process 100 for producing low-sulphur raisins is illustrated. In preferred embodiments, fresh, recently harvested grapes of the sultana variety may be used to produce golden raisins. However, it is to be appreciated that other types of grapes may be used to produce raisins which are within the scope of the present invention. It is also to be appreciated that the processes and methods disclosed herein may be adapted for other fruits for the purpose of reducing the presence of sulphur dioxide in dried forms thereof.

Starting with step 110 of FIG. 1, grapes may be placed into a fumigation chamber to be treated with sulphur dioxide ($SO_2$) gas. In some embodiments, the grapes may be placed into multiple trays or bins prior to transferring to a fumigation chamber. Sulphur dioxide may then be continuously applied to the grapes over several hours, but preferably 10 to 14 hours. In some embodiments, the amount of sulphur dioxide used to fumigate the grapes may be less than 5 pounds for every 1000 pounds of grapes. In certain embodiments, the amount of sulphur dioxide used to fumigate the grapes may be between about 2.7 ounces and about 5 pounds for every 1000 pounds of grapes. In preferred embodiments, the ratio of sulphur dioxide to grapes may be about 1:1000. Within a fumigation chamber, the amount of sulphur used for fumigation may be less than 1 ounce per cubic foot of the chamber. In some embodiments, the amount of sulphur dioxide used for fumigation may be between about 0.03 ounces and about 1 ounce per cubic foot of the chamber. In preferred embodiments, within a fumigation chamber, the amount of sulphur dioxide used for fumigation may be about 0.2 ounces per cubic foot of the chamber.

Following step 110, in optional step 111, the fumigated grapes may be removed from the chamber and bathed in cold water. Optionally following step 111, in optional step 112, the grapes may be transferred to a shaker and mechanically shaken.

Following step 110 or optional step 112, in step 120, the grapes may be bathed in hot water, the temperature of which may be between about 100 and about 200 degrees Fahrenheit. In preferred embodiments, the grapes may be bathed in a hot aqueous solution of sodium hydroxide (NaOH), wherein the ratio of sodium hydroxide to water may be about 1 pound to 47 gallons, respectively. In some embodiments, the temperature of the hot water, or aqueous solution, may be dependent on the sugar content of the grapes used and/or the sodium hydroxide concentration of the aqueous solution. For example, a batch of grapes having relatively low sugar content may be bathed in relatively cool water, whereas a batch of grapes having relatively high sugar content may be bathed in relatively warm water. In preferred embodiments, for a given sodium hydroxide concentration, the temperature of the hot water used for bathing may be between about 130 and about 160 degrees Fahrenheit for grapes having a sugar content between about 17 and about 19 Brix. For grapes having a sugar content between about 20 and about 24 Brix, the temperature of the hot water used for bathing may be between about 170 and about 190 degrees Fahrenheit. It is to be understood, however, that, in some embodiments, the aforementioned temperature ranges may be higher or lower, if the sodium hydroxide concentration is decreased or increased, respectively.

After being bathed in hot water, the grapes may, optionally, be transferred to another shaker and sprayed with cold water, according to optional step 121. In preferred embodiments, the grapes may be rinsed with high pressure sprays of cold water for approximately 5 seconds. Following optional step 121, the grapes may, optionally, be transferred to a spreader and placed onto drying trays, according to optional step 122.

Next, following step 120 or optional step 122, in step 130, the grapes may be placed into a dehydrator. In some embodiments, the grapes may be placed in one or more drying trays which may be wooden and stackable (to utilize the available vertical space within a dehydrator). In preferred embodiments, the grapes may be placed in one or more drying tunnels maintained at a temperature between about 120 and about 160 degrees Fahrenheit. Within this range, the grapes may be dehydrated for about 18 to about 24 hours, or until the grapes are sufficiently dry (i.e., containing less than approximately 20% moisture content).

Once the grapes are dried, they may be prepared for packaging and distribution, or they may be prepared for cold storage. However, if the concentration of sulphur dioxide is relatively low, the dried grapes may have a relatively short shelf life—therefore, it may be desirable to increase the sulphur dioxide concentration after drying. For example, as further illustrated in FIG. 1, step 130 may be followed by optional step 131, wherein the dried grapes may be fumigated with sulphur dioxide. Preferably, if the sulphur dioxide concentration of the dried grapes (now golden raisins) is less than 400 ppm, the dried grapes should be fumigated with additional sulphur dioxide. In preferred embodiments, the amount of sulphur dioxide added to the dried grapes, following the dehydration step, may be between about 1 and 10 pounds for every 1000 pounds of dried grapes. Within a fumigation chamber, the amount of sulphur dioxide used for fumigation, after the dehydration step, may be between about 0.2 ounces and about 2 ounces per cubic foot of the chamber. After the optional additional fumigation step 131, the dried grapes may be transferred to cold storage or prepared for distribution. It is to be understood, however, that the dried grapes may immediately be prepared for distribution, or transferred to cold storage, without an additional treatment of sulphur dioxide.

In the foregoing specification, exemplary embodiments have been described. However, one of ordinary skill in the art would appreciate that various modifications and changes can be made without departing from the scope of the invention as set forth in the claims below. Furthermore, the terms "approximately" and "about," or any other version thereof, are defined as being close to as understood by one of ordinary skill in the art. Accordingly, the specification and figures are to be regarded in an illustrative rather than a restrictive sense, and all such modifications are intended to be included within the scope of present teachings.

What is claimed is:

1. A dried grape having a moisture content of less than about 20% and more than about 10% and a sulphur dioxide concentration of between about 100 and about 1000 ppm.

2. The grape of claim 1, wherein said grape has a sulphur dioxide concentration of between about 100 and about 750 ppm.

3. The grape of claim 1, wherein said grape has a sulphur dioxide concentration of between about 350 and about 650 ppm.

* * * * *